United States Patent [19]
Ernst

[11] 3,836,298
[45] Sept. 17, 1974

[54] DEVICE FOR MANUFACTURING COATED HARD-FOAM TILES OF POLYURETHANE

[75] Inventor: Rudolf Ernst, Muenchen-Sollen, Germany

[73] Assignee: Kunstoff-Verfahrenstechnik Dr. Ing. Ernst GmbH & Co. KG, Munchen, Germany

[22] Filed: May 23, 1973

[21] Appl. No.: 363,085

[30] Foreign Application Priority Data
May 24, 1972 Germany............................ 2225204

[52] U.S. Cl.................. 425/115, 264/47, 425/371, 425/817 C
[51] Int. Cl............................................ B29d 27/00
[58] Field of Search............ 156/78, 79; 164/86, 87, 164/275, 278, 280; 264/47; 425/4 C, 817 C, 371, 372, 115, 223, 330; 198/184, 193, 195

[56] References Cited
UNITED STATES PATENTS

| | | |
|---|---|---|
| 3,035,302 | 5/1962 | Lysobey........................ 425/371 X |
| 3,231,070 | 1/1966 | Muller............................... 198/195 |
| 3,566,448 | 3/1971 | Ernst.................................. 425/4 C |
| 3,585,680 | 6/1971 | Eisenmann...................... 425/115 X |

Primary Examiner—R. Spencer Annear
Assistant Examiner—Mark Rosenbaum
Attorney, Agent, or Firm—H. Dale Palmatier

[57] ABSTRACT

Apparatus manufacturing coated hard-foam polyurethane tiles, including endless and confronting conveying bands spaced to receive foamed polyurethane between, the bands being formed of elongate plates extending transversely of the band and connected together at juxtaposed edges like a chain, the plates being adjustable in length to vary the width of the bands for varying the width of the tiles being formed, the plates having meshed comb-like teeth and screw devices for holding the plates in predetermined lengths.

8 Claims, 7 Drawing Figures

DEVICE FOR MANUFACTURING COATED HARD-FOAM TILES OF POLYURETHANE

The invention refers to a device for manufacturing coated hard-foam tiles of polyurethane in a two-band plant, the bands of which consist of rigid plates which are connected like the links of a chain.

In known devices of the above-mentioned kind it is possible to adjust the space between the two bands of the two-band plant to permit foaming. This is accomplished, for example, by means of hydraulic piston and cylinder units which connect the two bands with each other. In this way the thickness of the hard-foam tile strip being manufactured is regulated. In order to set and regulate the width of this hard-foam tile strip following regulation of its thickness, lateral edge strips are deployed, the stoutness of which varies according to the distance separating the two bands. The edge strips fit exactly into the space between the two bands such that they can be laterally shifted to determine the width of the hard-foam tile strip being manufactured. Whenever the thickness of the hard-foam tile strip being manufactured, i.e., the vertical distance between the two bands, is readjusted, the lateral edge strips must be replaced.

It is the task of the present invention to create a device of the type mentioned in the introduction which will make it possible to produce hard-foam tiles of varying width without replacement of the lateral edge strips.

In principle, this task is accomplished as follows: The width of the plates which form the bands or chains can be adjusted transversely to the direction of conveyance in the two-band plant.

Because the plates of at least one of the bands can be adjusted transversely to the direction of conveyance in the two-band plant, it is not necessary to replace the lateral edges. After the distance between the two bands has been regulated, and after the width has been regulated by adjusting the plates transversely to the direction of conveyance in the two-band plant, the lateral edges are then likewise simply adjusted transversely to the direction of conveyance until an adequate seal at the edge strip is assured. The lateral edges are moved until they are tight against the adjusted plates. If, for example, only the upper band is adjusted, the lateral edges can be moved over the unadjusted lower band in such a way that an adequate seal is attained in this area. If the plates of both the upper and the lower band are adjusted, following this adjustment the lateral edge strips are moved until they fit tightly with both of the belts which delimit the space in which foaming occurs.

It is advantageous if the device according to the invention is so constructed that each adjustable plate consists of at least two adjacent parts or sections and if two adjacent sections interlock with each other like the meshed teeth of combs and can be moved relative to each other transversely to the direction of conveyance in the two-band plant.

The comb-like section makes it possible to adjust the plates transversely to the direction of conveyance in the two-band plant. Other adjustment mechanisms, e.g., telescopic guides and the like, are, of course, possible. If the coating is to be done with pliable and thin cover layers, then the combs are made as narrow as possible in the direction of conveyance to prevent warping of the coating material in this area and resultant unevenness in the surface of the hard-foam tile thus produced. In the case of rigid cover layers, the use of narrow combs is not such a critical matter.

Other advantageous developments of the invention are the subject of claims 3 – 6.

DETAILED DESCRIPTION OF THE INVENTION

Figure 1:
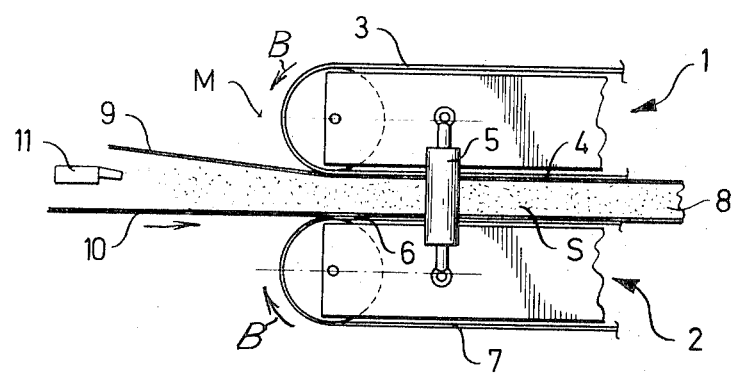
FIG. 1 shows a schematic side view of the front part of a two-band plant.

The two-band plant represented in FIG. 1 consists of an upper band 1 and a lower band 2. The upper band 1 has an upper run 3 and a lower run 4. Correspondingly, the upper run of the lower band 2 is designated as 6 and the lower run of this lower band 2 is designated as 7. The distance between bands 1 and 2 can be adjusted via hydraulic piston and cylinder units 5 to regulate the thickness of the strip 8 of the foam material. The upper coating layer is indicated by 9 and the lower coating layer with 10. A foaming fixture 11 which can be stationary and adjustable, or moved in a sweeping movement back and forth transversely to the direction of conveyance, is located between the coating materials 9 and 10. According to the type of product desired, the coating layers 9 and 10 can be of firm or flexible material. If firm cover layers are used, it is advantageous to feed them in continuously in the form of plates right from the pile or stack. Flexible cover layers are continuously drawn off a supply roll and guided in strip form into the two-band plant.

The lateral edges are provided by foils or paper strips 12 (see FIG. 2 and FIGS. 4 – 6), also guided along with the cover layers 9 and 10. These lateral edge foils 12 can be folded and guided in any of a great variety of ways.

Figure 2:
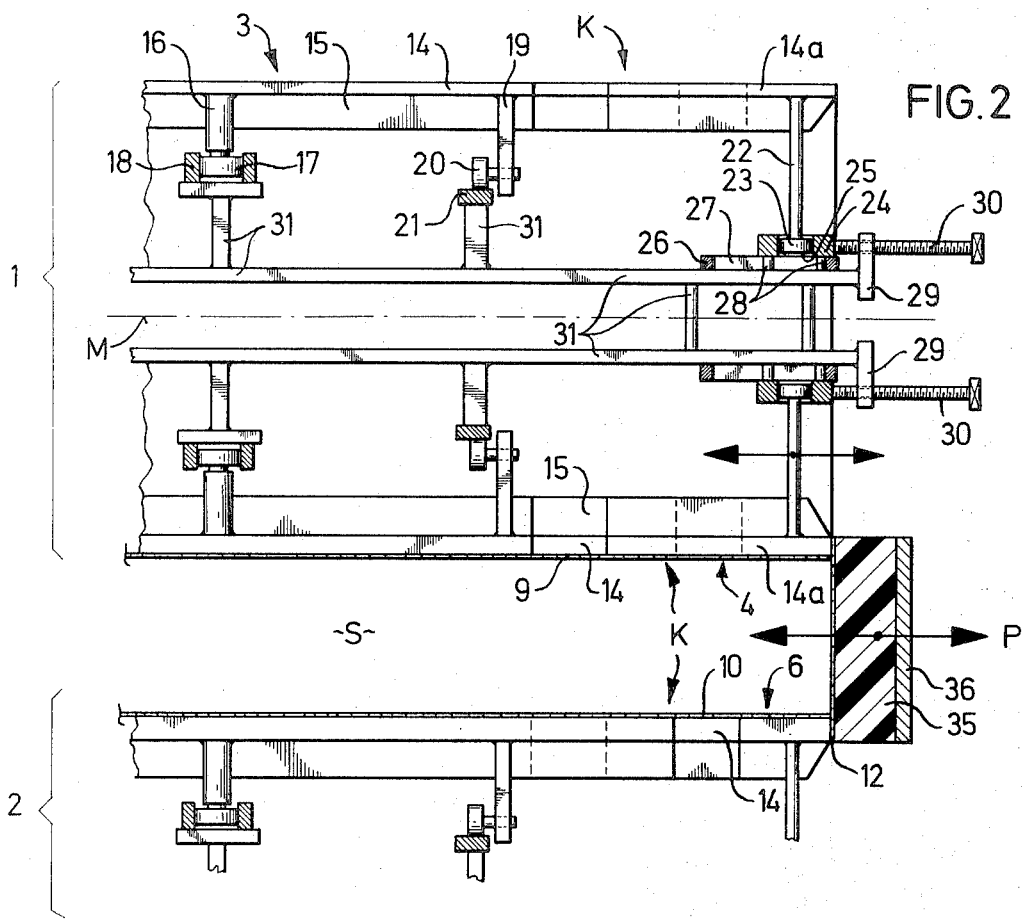
FIG. 2 shows a partial view in an enlarged scale and sectioned transversely to the direction of conveyance in the two-band plant and illustrates the adjustment of the plates.

The midline of the upper band which is indicated by M in FIG. 1 also appears in FIG. 2 to point out the position of space S for foaming.

In FIG. 2 only runs 3, 4 and 6 are discernible. Between runs 4 and 6 is located space S. Each individual plate is indicated by 14. Beneath each plate there is a reinforcement 15.

The elongate plates 14 lie parallel to each other and extend transversely of the direction of conveyance. The side edges of adjacent plates 14 confront each other and may abut each other. The confronting side edges of adjacent plates 14 are hinged or swingably connected to each other, so that the cumulative effect is of an elongate endless chain-like band 1, 2. In other forms the side edges of adjacent plates 14 may not be pivotally interconnected, but may merely abut each other; in which form, the guiding of the plates in a seemingly endless band would necessarily be more complicated.

Substantially continuous linear movement of the bands 1, 2 in the direction of arrow B is provided from a suitable source of driving power so that runs 4 and 6 travel and carry the foamed polyurethane 8 and covers 9, 10 therebetween.

A stationary frame 31 of the upper band bears various tracks and guides for the plates 14. To prevent shifting transversely to the direction of conveyance in the middle section of the two-band plant a track 18 is affixed to frame 31, and guides a roller 17 which is connected with plate 14 via an arm 16.

The spacing between bands 1, 2 is maintained by tracks 21. The portion of each plate 14 which is not laterally adjustable is guided by a track 21, on which runs a roller 20. This roller 20 is connected with plate 14 via an arm 19. Each adjustable section 14a of each plate 14 is provided with a rod 22, at the end of which a roller 23 is installed. This roller is guided in track 24 on frame 31. Track 24 is provided with pegs 28 which can move transversely to the direction of conveyance of the two-band plant in slots 27 of guides 26. The guides 26 are rigidly connected with the frame 31. Track 24, together with roller 23, rod 22 and portion 14a of plate 14, can be laterally moved by means of a number of screws 30. Screws 30 are threaded into bearings 29 which are likewise affixed to the stationary frame 31.

As represented in FIG. 2, separate screws 30 are provided for belts 3 and 4. In a different form this adjustment of belts 3 and 4 can be accomplished by a common screw or an equivalent machine component.

In the sample version shown in FIG. 2, the plates of runs 6 and 7 of the lower band 2 are also adjusted. For this reason, the lateral edge strips 35, 36 are next to plates 14 of belts 4 and 6. If only the runs 3 and 4 of the upper band 1 are to be adjusted, it must be possible to move lateral edge strips 35, 36 by plates 14 of the upper run 6 of the lower conveyor band 2 to facilitate accommodation to the adjustment of the plates of runs 3 and 4. The lateral mobility of lateral edge strips 35, 36 is indicated by a double arrow P.

Figure 3:
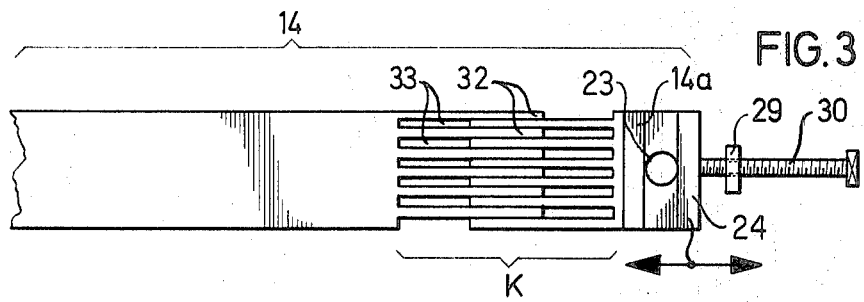
FIG. 3 shows a top view of one side of an adjustable plate.

FIG. 3 illustrates the shape of plates 14 and the comb-like section K by which section 14a of plate 14 can be shifted. Comb teeth 32 mesh with slots 33.

Figure 4:
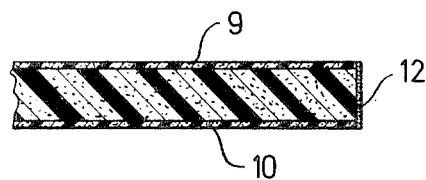
FIG. 4 shows a cross section through a hard-foam tile coated with rigid cover layers.
Figure 5:
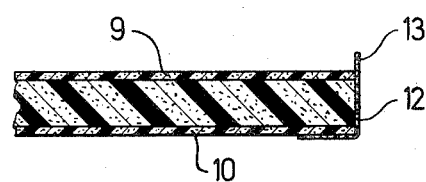
FIG. 5 shows a cross-section through a hard-foam tile coated with rigid cover layers and with another lateral edge foil.
Figure 6:
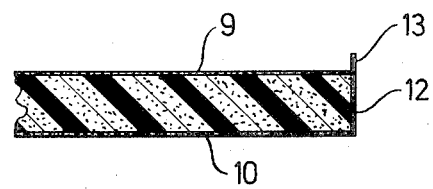
FIG. 6 shows a cross-section through a hard-foam tile coated with a flexible cover layer.

FIGS. 4 – 6 illustrate coating of hard-foam tiles with laterally applied paper strips 12. With the device according to the invention it is also possible to manufacture hard-foam tiles without lateral paper strips, as, for example, when a separating agent is used.

In the examples provided by FIGS. 4 and 5 coating was done with firm cover layers 9 and 10. In the case of FIG. 4, a paper strip 12 was simply applied to adhere to the side. In the case of FIG. 5, the paper strip was creased in the shape of an L and guided in. The excess section 13 of paper strip 12 can be cut off after manufacture.

Figure 7:
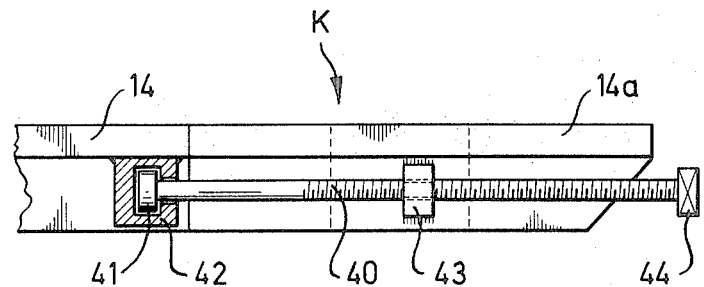
FIG. 7 shows a section which is basically analogous to that of FIG. 2 but shows a different sample version for adjusting the plates.

The modified form according to FIG. 7 represents a simplified way of adjusting the plates. This form is also suitable for later installation in already existing, non-adjustable devices. In this form, the components 22 – 30 of the form according to FIG. 2 are omitted for illustration. To adjust each individual plate 14 in FIG. 7, screw 40 is provided for each plate. The screw is rotatable at 41 in track 42 affixed on plate 14 and cannot be axially moved relative to the middle non-adjustable portion of the plate 14. Screw 40 is connected with the adjustable section 14a of plate 14 by a threaded nut 43, affixedly connected to section 14a. By applying a tool to rectangle 44, section 14a can be moved relative to the other part of plate 14 when screw 40 is turned.

When the intent is to manufacture a hard-foam tile of a certain thickness and width using the device here described and illustrated, the thickness is first adjusted by means of the hydraulic piston and cylinder unit 5. Thereafter the sections 14a of plates 14 are moved transversely to the direction of conveyance in the two-band plant 1, 2 until the desired width is attained for the hard-foam tile strip to be manufactured. Depending on the form used, this adjustment is accomplished for each individual plate (FIG. 7) either on belts 3 and 4 of the upper band only or on the belts of both bands 1 and 2.

After the adjustment transversely to the direction of conveyance in the two-band plant has been made, it is necessary only to accommodate the lateral edges 35, 36 to this adjustment movement in order to assure a lateral seal. It is not necessary to replace the lateral edges 35, 36. Only a lateral movement as indicated by the double arrow P is used.

I claim:

1. Apparatus for producing coated hard-foam tiles of foamed polyurethane in a two-band plant, a pair of conveying bands in confronting relation with each other and including a plurality of rigid plates connected like the links of a chain, a foaming fixture supplying polyurethane between the confronting bands, the plates which form the chain being adjustable for width transversely to the direction of conveyance in the two-band plant, and means retaining the plates at the desired width.

2. The invention according to claim 1 wherein each of said extensibly and retractably adjustable plates includes at least two sections, each of said sections having elongate teeth and spaces between the teeth slidably receiving the teeth of the other section in meshed relation, said sections being movable transversely to the direction of conveyance of the conveying bands.

3. The invention according to claim 2 and including frame means with stationary track means guiding the conveying bands and plates in predetermined relation to each other, the toothed portions of the plates being disposed transversely of the track means and adjacent the edges of the bands.

4. The invention according to claim 1 and each of the bands having linear runs formed by the confronting plates, each run and the plates therein being individually adjustable transversely to the direction of conveyance in the two-band plant.

5. The invention according to claim 1 and means for adjusting the width of both bands and the plates thereof together.

6. The invention according to claim 1, including frame means and screws connected between the frame means and guide tracks for the movable sections of the plates transversely to the direction of conveyance in the two-band plant for controlling the width of the conveying bands.

7. The invention according to claim 1 wherein a screw is provided interconnecting the sections of each plate for correcting the width of the conveying bands.

8. The invention according to claim 7 wherein the screw is rotatably mounted on one part of the plate and is connected with the other adjustable section of the plate by a threaded nut.

* * * * *